(No Model.)

L. M. BERRY.
SPRINKLER.

No. 489,408.  Patented Jan. 3, 1893.

Witnesses

Inventor
Louis M. Berry,
By
Attorney

THE NORRIS PETERS CO., PHOTO-LITHO., WASHINGTON, D. C.

UNITED STATES PATENT OFFICE.

LOUIS M. BERRY, OF BOSTON, MASSACHUSETTS.

SPRINKLER.

SPECIFICATION forming part of Letters Patent No. 489,408, dated January 3, 1893.

Application filed July 21, 1892. Serial No. 440,716. (No model.)

*To all whom it may concern:*

Be it known that I, LOUIS M. BERRY, of Boston, in the county of Suffolk and State of Massachusetts, have invented certain new and useful Improvements in Sprinklers; and I do hereby declare the following to be a full, clear, and exact description of the invention, such as will enable others skilled in the art to which it appertains to make and use the same.

This invention relates to certain new and useful improvements in sprinklers and has for its object the production of a cheap, simple and highly efficient portable sprinkler in which a maximum amount of water can be held in suspension ready for use.

The invention comprises a sprinkler having a vessel provided with a foraminous bottom and an absorbent of unwoven and unspun animal wool which will by capillary attraction absorb and hold a maximum amount of water in suspension ready for sprinkling by shaking the vessel, which latter is provided with a vent opening above the foraminous bottom to permit the water to escape and to vary the amount thereof, substantially as hereinafter fully set forth and particularly pointed out in the claim.

Figure 1:
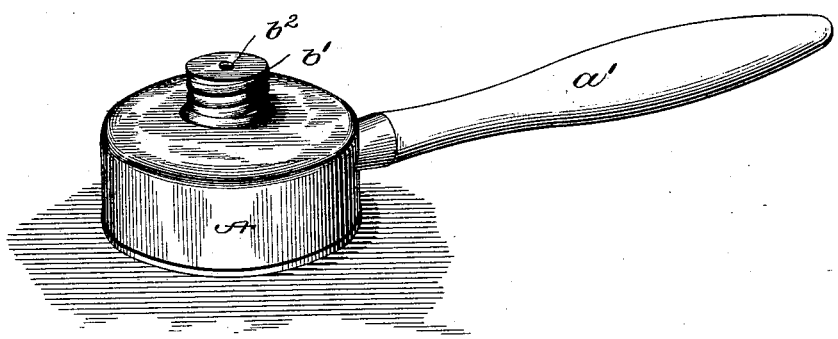
Figure 2:
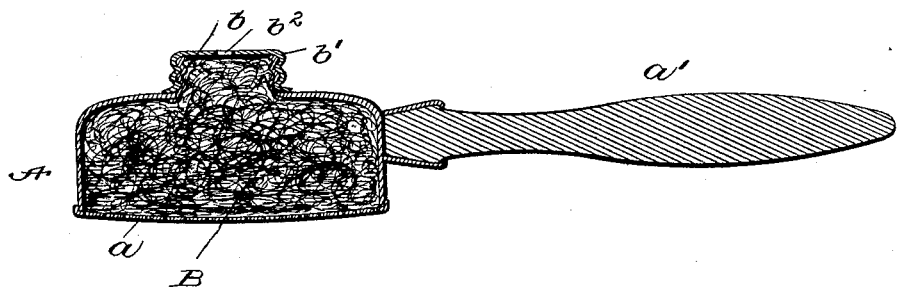

In the accompanying drawings:—Figure 1 is a view in perspective of my improved sprinkler. Fig. 2 is a vertical longitudinal sectional view thereof.

Referring to the drawings, A designates a circular, or other shaped, box or body having a lower foraminous bottom $a$ which is preferably slightly curved. To the top or one side of this box or body is secured a lateral projecting handle $a'$ by which the operator holds or grasps the sprinkler. From the center of the top projects a threaded nipple or collar $b$ with which engages a screw cap $b'$ having a central vent opening $b^2$ which may be made of various sizes to regulate the amount of escape water held in suspension.

B is an absorbent composed of unwoven and unspun animal wool located within and filling box or body A, it being supplied through the top thereof. The absorbent fills or occupies nearly the entire space within the box or body A and by employing animal wool in its raw state I procure an absorbent of a superior nature. In this condition the wool is "springy" and will not become sodden, thus preserving the fibers in an extended condition so that they will, by capillary attraction, absorb and hold or retain water in suspension throughout their entire length. Thus the fibers form almost innumerable capillary holders for the water.

In practice the box or body containing the wool filling is placed in a vessel or body of water so that the wool will absorb the water and hold it in suspension, all air being permitted to escape through the vent opening. This opening likewise permits the absorbent to give forth the full quantity of water when the sprinkler is shaken by the operator in sprinkling clothes, carpets, flowers and the like.

The advantages of my invention are apparent. In the first place a sprinkler thus constructed is extremely simple and inexpensive. By employing animal wool unwoven and unspun a springy absorbent is secured and all the fibers will retain water throughout their entire length and likewise when the sprinkler is shaken or operated they will give forth every particle of water held in suspension.

I am aware that it is not new to provide a sprinkler with a reservoir having a lower perforated ball-like chamber in which a sponge is located to control the outflow of water and to absorb all water left in said chamber after sprinkling; and also that a sprinkler having screen covered ends and a sliding or movable absorbent pad has heretofore been employed. Also that it is old in the art to provide a clothes sprinkler with a circular piece of wire gauze and a pad of hair designed to hold water, which is ejected therefrom upon the pad being struck against said screen; and also that a clothes sprinkler has been made by securing by threads a mass of tufts of woolen yarn. My invention is designed as an improvement over all of these forms of invention. The animal wool employed by me is unspun and unwoven and is not formed into yarn tufts, nor is it attached by threads or any other means. It is placed in its natural state within a reservoir having a foraminous bottom. The fibers of the wool will absorb and hold water throughout their entire length, and in this way a maximum amount of water is held in suspension and can be readily ejected in spray forms by merely shaking the sprinkler. A sprinkler thus constructed is extremely simple and inexpensive, and by means thereof a highly efficient and serviceable device is secured.

I claim as my invention:—

The herein-described improved sprinkler, comprising the box or body having a foraminous bottom and a vent or opening in its top, and an absorbent in said box or body composed of animal wool in its springy state unwoven and unspun, substantially as set forth.

In testimony whereof I have signed this specification in the presence of two subscribing witnesses.

LOUIS M. BERRY.

Witnesses:
MICHAEL WILLIAM BRICK,
LEWIS W. HOWES.